(12) United States Patent
Meads et al.

(10) Patent No.: US 10,084,905 B2
(45) Date of Patent: Sep. 25, 2018

(54) SYSTEM ARCHITECTURE FOR CLOSED-LOOP MOBILE LOCKSCREEN DISPLAY STATE CONTROL

(71) Applicant: Accenture Global Services Limited, Dublin (IE)

(72) Inventors: Christopher Robert Jeffrey Meads, Reading (GB); Charles William David Dewhurst, London (GB)

(73) Assignee: Accenture Global Services Limited, Dublin (IE)

( * ) Notice: Subject to any disclaimer, the term of this patent is extended or adjusted under 35 U.S.C. 154(b) by 205 days.

(21) Appl. No.: 14/837,661

(22) Filed: Aug. 27, 2015

(65) Prior Publication Data
US 2016/0065725 A1    Mar. 3, 2016

Related U.S. Application Data

(60) Provisional application No. 62/043,184, filed on Aug. 28, 2014.

(51) Int. Cl.
*H04M 1/725* (2006.01)
*H04W 4/02* (2018.01)
*H04W 12/06* (2009.01)
*G06Q 30/02* (2012.01)

(52) U.S. Cl.
CPC ......... *H04M 1/72577* (2013.01); *H04W 4/02* (2013.01); *H04W 12/06* (2013.01); *G06Q 30/0251* (2013.01)

(58) Field of Classification Search
CPC ... H04M 1/72577; H04W 12/06; H04W 4/02; G06Q 30/0251
See application file for complete search history.

(56) References Cited

U.S. PATENT DOCUMENTS

| 8,270,944 B1 | 9/2012 | Gailloux et al. |
| 9,454,251 B1 * | 9/2016 | Guihot ............... G08C 17/02 |
| 2012/0084734 A1 * | 4/2012 | Wilairat ............ G06F 21/629 715/863 |
| 2013/0124276 A1 | 5/2013 | Brown |
| 2014/0019253 A1 | 1/2014 | Ricasata |
| 2014/0040035 A1 | 2/2014 | Cusack |
| 2014/0109175 A1 * | 4/2014 | Barton ............... H04L 63/0807 726/1 |
| 2014/0180822 A1 | 6/2014 | Peebles et al. |
| 2014/0245202 A1 * | 8/2014 | Yoon .................... G06F 3/0482 715/765 |

OTHER PUBLICATIONS

European Patent Office, Examination Report for European Patent Application No. 15182662.5 dated Mar. 2, 2018 pp. 1-5.

* cited by examiner

*Primary Examiner* — Joseph Dean, Jr.
(74) *Attorney, Agent, or Firm* — Brinks Gilson & Lione

(57) ABSTRACT

A system presents close-loop controlled display states on the lockscreen of a mobile device. Contextual information may be collected at the mobile device. The system may access subscriber identity register data to determine subscription registry status for a mobile subscriber associated with the device. The subscriber identity register data and contextual information may be processed by closed-loop display state selection circuitry and next action selection logic to generate a display state selection. The display state selection is sent to the mobile device. The selected display state may be displayed during lockscreen invocations at the mobile device.

20 Claims, 8 Drawing Sheets

SYSTEM ARCHITECTURE FOR CLOSED-LOOP MOBILE LOCKSCREEN DISPLAY STATE CONTROL

PRIORITY CLAIM

This application claims priority to U.S. Provisional application No. 62/043,184, filed 28 Aug. 2014, which is entirely incorporated by reference.

TECHNICAL FIELD

This disclosure relates to a complex system architecture for closed-loop status control system for data communications between a telecommunications mobile service provider and a mobile subscriber's user equipment.

DETAILED DESCRIPTION

Figure 1:
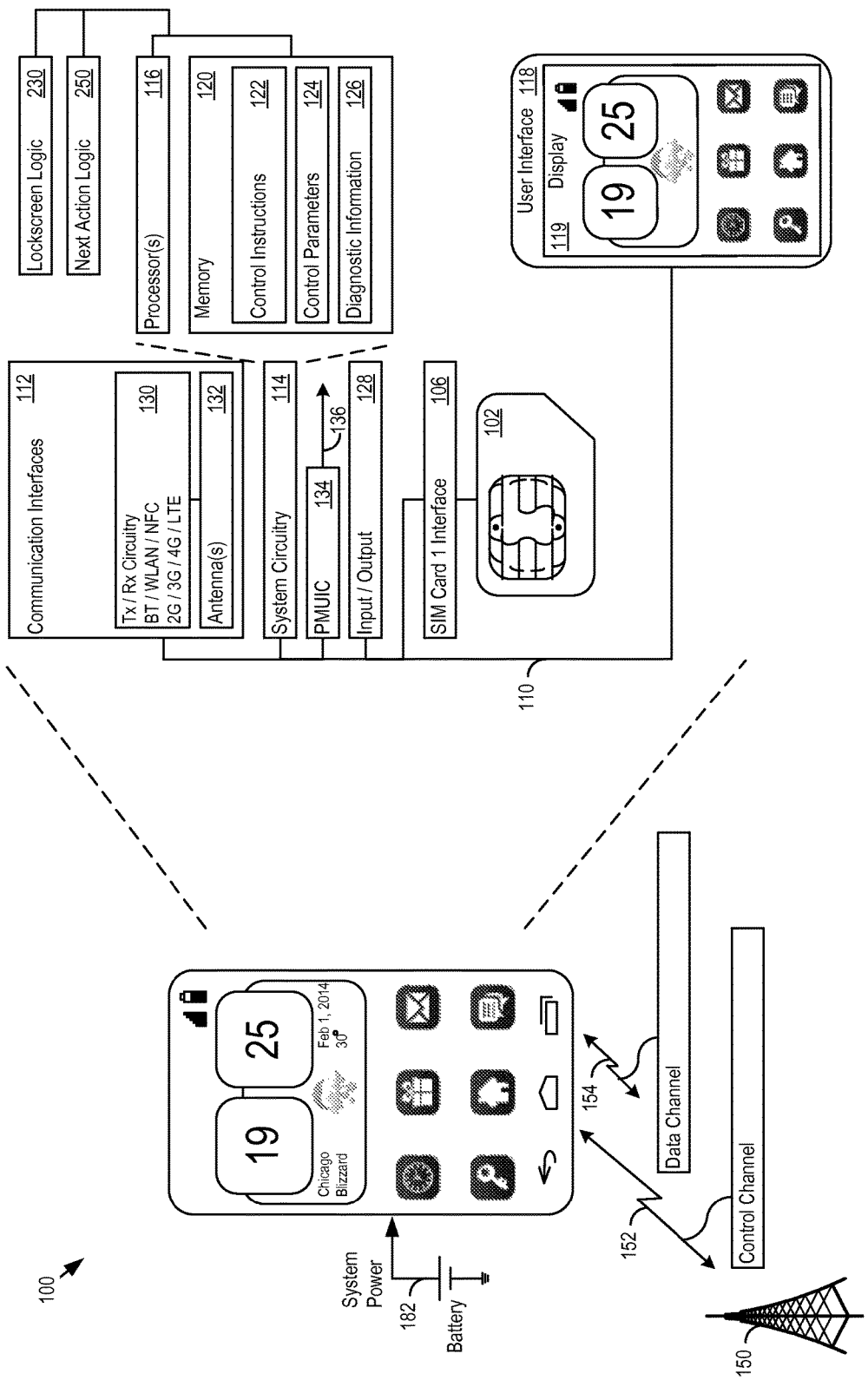
FIG. 1 shows an example of user equipment.

In closed-loop systems, a control station controls one or more operational states, e.g., transmission power, activity states, or other states, of a client device. Similarly, a control station, e.g., a cellular base station coupled to a control server, an access point coupled to an analytics system, or other control station, may control the lockscreen display state of a mobile device. The control station may receive status or usage information from the mobile device. Using the received information and subscriber register identity data, e.g., taken from a subscriber information database, the control station may send configuration signals to the mobile device to update the lockscreen display state of the mobile device.

Mobile subscribers may create an account with a service provider to receive mobile telecommunication services including telephony, data, text messaging, location based services, and/or other services. In some cases, mobile subscribers may receive notice of their usage and associated charges accrued at the end of a billing period. In other cases, such as prepaid accounts, the subscribers may receive notice of their usage. In some cases, the delay between notice of the usage and charges and the actual associated use may lead to confusion for the mobile subscriber. "Bill shock" and/or other mobile subscriber confusion may lead to increased overhead for a service provider in the form of service calls, service visits, and/or other non-self-service customer interactions. In some cases, such confusion may lead to reduced customer satisfaction with the mobile service.

In some cases, monitoring activity for a single mobile device may lead to incomplete usage information for an account. Shared plans may reflect usage from multiple devices, which may not necessarily monitored by any single one of the multiple devices. Accessing account information from a wireless carrier may allow for complete account usage information to be obtained.

Additionally or alternatively, mobile subscribers may be interested in opportunities to tailor their mobile plan (e.g. recurring subscription, prepaid plan, or other mobile plan) to the mobile subscribers' actual usage as tracked by the service provider. Such opportunities may provide the mobile subscriber with superior plan selection information than may be available to the mobile subscriber at the time of signing up with the service provider. The mobile subscriber may also have a more positive reaction to being alerted to a service upgrade that may likely lead to saving based on the subscriber's usage when compared to being alerted after plan overage charges or other incidental charges have been accrued.

In some cases, account status updates and/or offers may be provided via email, text message, or in-app advertising. In some cases, a mobile subscriber may ignore, block, or otherwise filter these updates and offers. For example, a mobile subscriber may be unaware a particular notice is targeted to the subscriber's own usage because email, text message, and in-app advertising are communication channels available to a wide array of possible contacts. Thus, the mobile subscriber may be left unaware of the potential benefits from these notifications.

The lockscreen display state may include various physical states of a display, e.g., liquid crystal display (LCD) polarization states, backlight brightness, pixel opacities, light emitting diode (LED) output levels, output frequencies and amplitude for audio devices, or physical output states of other media presentation devices. For mobile devices equipped with touchscreen panels, the control station may send configuration parameters, e.g., size, number, function, or other parameters, for capacitive buttons to be rendered on the touchscreen panel to support the display state.

In various implementations, display states, e.g., showing account-targeted updates and/or offers, may be presented on the lockscreen of a mobile subscriber's user equipment (UE). A lockscreen may be a screensaver, password prompt screen, security logon, idle mode screen, startup splash screen, and/or other UE display state associated with short or long term user inactivity. In some cases, users may view information on lockscreen to get communication updates, such as recently received texts, missed call indications, and/or other communications updates; time information; calendar notifications; and/or logon prompts. In some cases, a user may view a UE lockscreen multiple times per day. Lockscreen-based notification may provide a mode for reliably informing mobile subscribers of account-status information and/or account-targeted offers because closed-loop lockscreen display state updates provide a communication conduit which may be access controlled by the service provider. Thus, the mobile device user may be assured that communications appearing as a result of display state updates originate from the service provider or sources that were approved by the service provider.

FIG. 1 shows an example UE 100. The UE 100 is a smartphone in this example, but the UE may be any mobile subscriber device, such as, but not limited to, a smartphone, smartwatch, smartglasses, smart fitness monitor, tablet, laptop computer, or other device, which has a lockscreen. The techniques described for implementing the closed-loop mobile lockscreen display state control may be used in a wide array of different types of devices. Accordingly, the smartphone example described below provides just one example context for explaining the architectures and techniques.

As one example, the UE 100 may be a 2G, 3G, 4G/LTE, or faster cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE 100 may also be a smartphone that, in addition to making and receiving phone calls, runs any number or type of applications. The UE 100 may, however, be virtually any device that implements a user interface (UI) and receives account based information services including, as additional examples, but not limited to, a driver assistance module in a vehicle, a pager, a video game console human interface device (HID), smart watch or other wearable device, or virtually any other data device.

The example UE 100 may be in communication with a network controller 150, such as an enhanced Node B (eNB) or other base station. The network controller 150 and UE 100 establish communication channels such as the control channel 152 and the data channel 154, and exchange data. The UE may receive configuration signals over the control 152 and/or data 154 channels which may update the lockscreen display state of the mobile device. For example, the network controller 150 may be coupled to a control server and may send display state tokens 199 to the UE 100 over control 152 and/or data 154 channels. The display state tokens 199 may include data for selection and rendering of lockscreen display states. In this example, the UE 100 supports one or more Subscriber Identity Modules (SIMs), such as the SIM1 102. Electrical and physical interface 106 connects SIM1 102 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118.

The user interface 118 and the inputs 128 may include a graphical user interface, a display 119 (e.g., a touch sensitive display), haptic feedback or other haptic output, voice or facial recognition inputs, buttons, switches, speakers or other audio devices, and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs. In some implementations, the display 119 may include may include an array of pixels, which may generate images by altering their physical states. In a lockscreen mode, the physical states of the pixels in the display may be controlled, at least in part, by a control station using a closed-loop control protocol.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, WiFi, 3G, or other data 126 that the UE 100 will send, or has received, through the communication interfaces 112.

In some implementations, the processors 116 and memories 120 may support execution of lockscreen logic 230 for implementation of lockscreen display states and/or next action logic 250 for selection of lockscreen display states as discussed below.

The UE 100 may include a power management unit integrated circuit (PMUIC) 134. In a complex device like a smartphone, the PMUIC 134 may be responsible for generating as many as thirty (30) different power supply rails 136 for the circuitry in the UE 100. In various implementations, the system power may be supplied by a power storage device, such as a battery 182

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Figure 2:
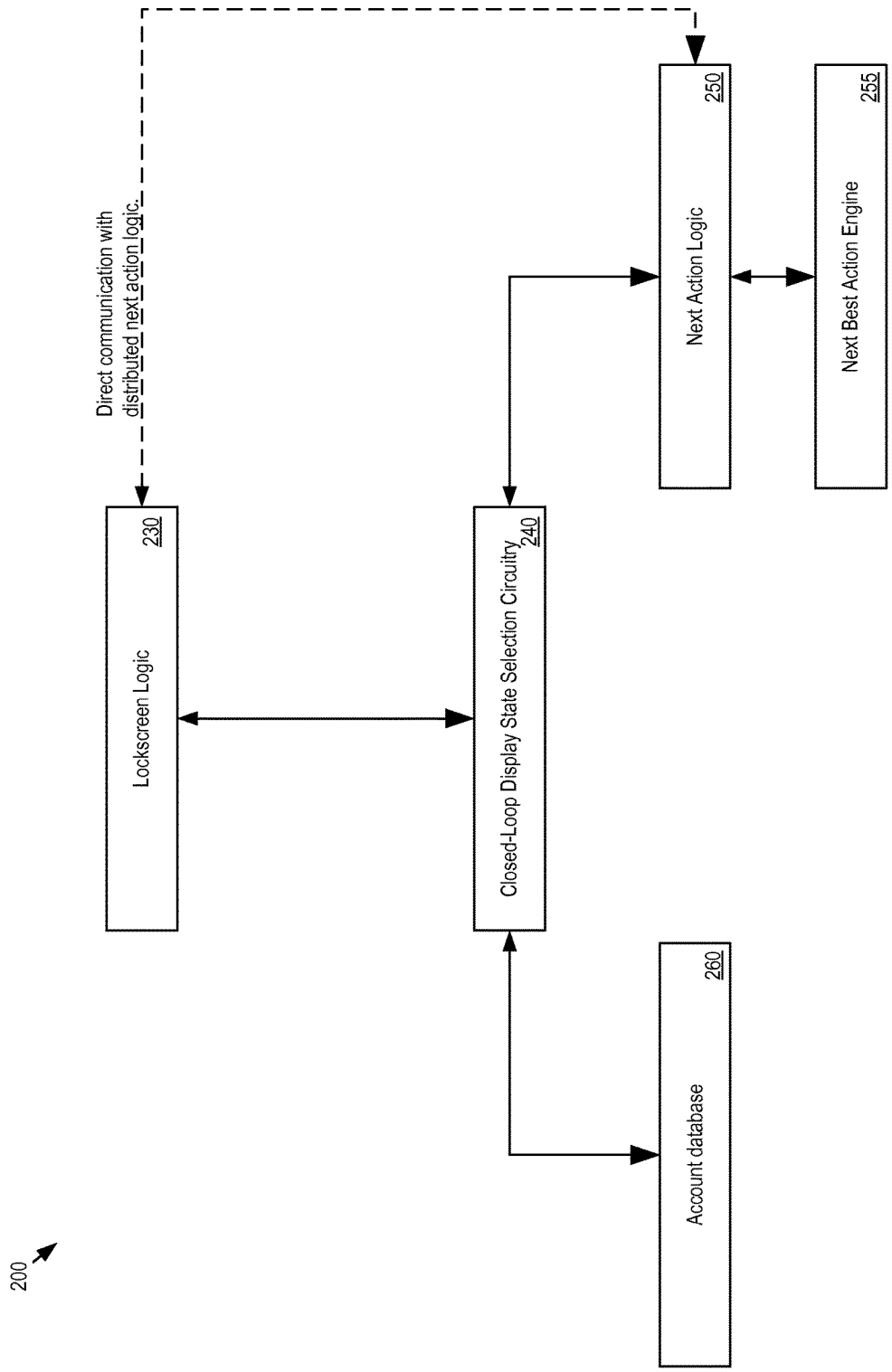
FIG. 2 shows an example of execution architecture for the closed-loop display state control.

FIG. 2 illustrates an exemplary execution architecture 200 for closed-loop lockscreen display state control. The example architecture may include lockscreen logic 230 running on a UE 100. The lockscreen logic 230 may be in data communication with closed-loop display state selection (CLDSS) circuitry 240 included in a control station, which may include a wireless base station coupled to a server or other computing entity remote to the UE 100. In various implementations, the lockscreen logic may be in data communication with next action logic 250. The lockscreen logic 230 may provide contextual information, such as, location data, usage data, and/or other contextual information to the CLDSS circuitry 240. The CLDSS circuitry 240 may be in data communication with next action logic 250. The next action logic 250 may include a next best action engine 255 for selecting among one or more possible offers or notifications of presentation by the lockscreen logic 230. In various implementations the next action logic 250 may be present on the computing entity remote to the UE 100 or may be partially or fully disposed on the UE 100.

The CLDSS circuitry 240 may further be in data communication with an account database 260. The CLDSS circuitry 240 may access account information stored in the account database 260. The account database 260 may include a customer relationship management (CRM) system, a billing system, and/or other databases storing information specific to mobile subscriber accounts. The account database may be maintained by the service provider for the UE 100. For example, the account database may be host account information for a wireless carrier that provides telephony and/or services for the UE 100. The CLDSS circuitry 240 may provide the accessed account information and/or contextual information to the next action logic 250. The next action logic 250 may respond to the account information and/or contextual information with a suggestion of one or more display states matched to the received information. The offer management logic 240 may provide one or more of the display states to the lockscreen logic 230 for display. Additionally or alternatively, the lockscreen logic 230 may receive offer selections directly from the next action logic 250.

Figure 3:
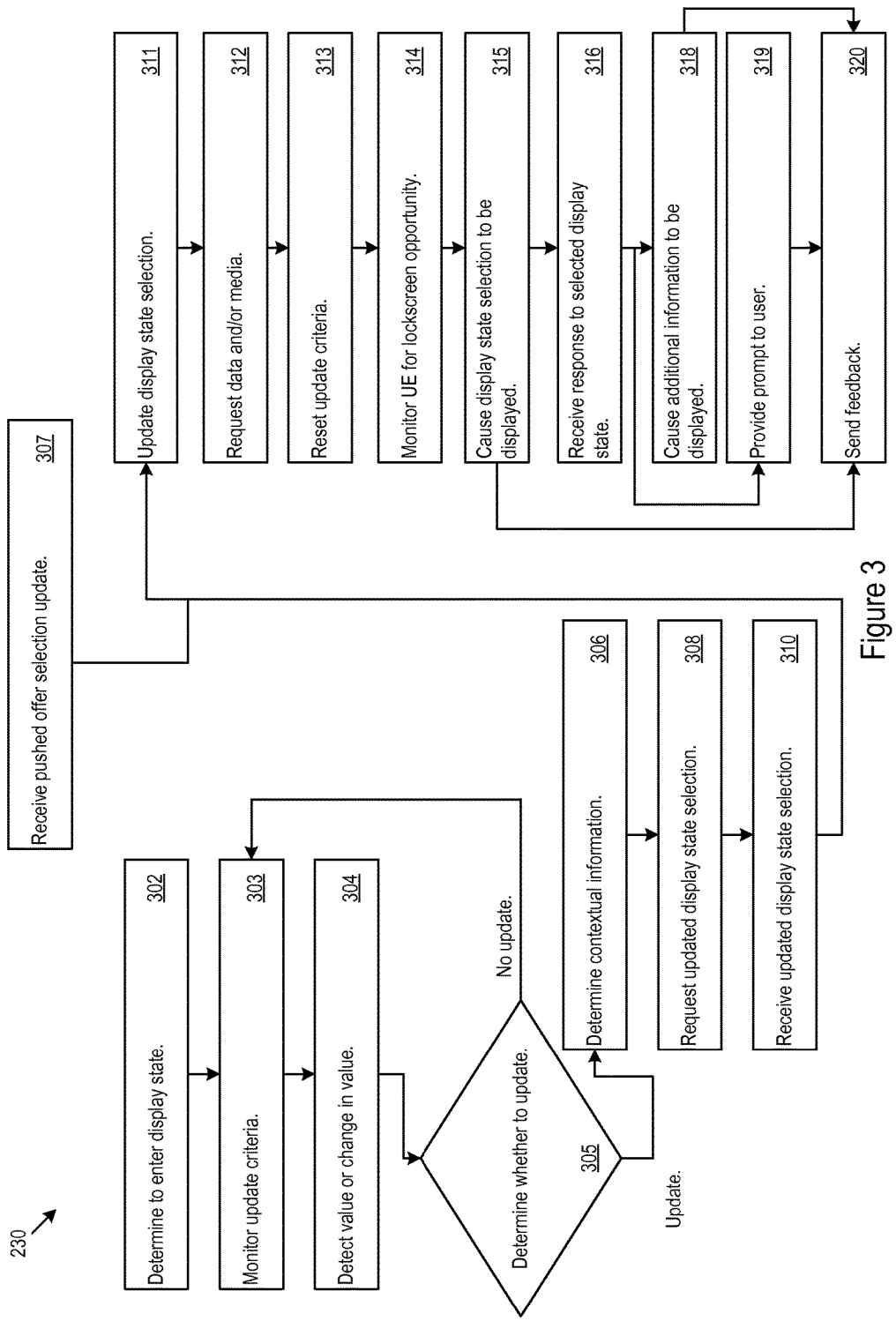
FIG. 3 shows an example of lockscreen logic for closed-loop control of lockscreen display states.

FIG. 3 shows an example of lockscreen logic 230 for closed-loop control of mobile lockscreen display states. The lockscreen logic 230 may determine to enter a display state a next lockscreen opportunity (302). The lockscreen logic may monitor one or more update criteria (303). The lockscreen logic may detect a value or change in a value associated with the update criteria (304). For example, the lockscreen logic 230 may determine to update based on a passage of a period of time and/or an indication that the UE 100 has been moved to a new location. In an example scenario, the lockscreen logic 230 may determine that no initial display state selection has been made. Thus, the lockscreen logic 230 may determine to initiate display state selection to ensure display state is configured at the next lockscreen opportunity, e.g., when the mobile device invokes a lockscreen state. In an example, the lockscreen logic may determine that a display state selection has been viewed and/or displayed more than a threshold number of times. Responsive to the detected value, the lockscreen logic 230 may determine whether to update and/or initialize a lockscreen display state selection (305). In some implementations, the lockscreen logic 230 may determine to update the display state selection based one or more contextual update criteria.

If the lockscreen logic 230 determines not to update the lockscreen display state selection, the lockscreen logic may continue monitoring the update criteria (303).

If the lockscreen logic 230 determines to update the lockscreen display state selection, the lockscreen logic 230 may determine contextual information (306). For example, the lockscreen logic 230 may determine the current time and/or location of the UE 100. The lockscreen logic 230 may request an updated display state selection from the offer management logic 240 (308). For example, the lockscreen logic 230 may request to receive a display state token, which may contain a display state selection and data to support the display state selection. The request may include the contextual information.

Responsive to the request, the lockscreen logic 230 may receive an updated display state selection (310). The lockscreen logic may update the display state selection for the UE 100 based on the received selection (311). The lockscreen logic may request data and/or media used in the selected display state (312). The lockscreen logic may reset the one or more update criteria (313). The lockscreen logic 230 may monitor the UE for a lockscreen opportunity (314). When the lockscreen logic 230 detects a lockscreen opportunity, the lockscreen logic 230 may cause the UE 100 to display the display state selection via user interface 118 (315).

In various implementations, the lockscreen logic 230 may receive a pushed updated display state selection (307) without sending a request, e.g., as a display state token from a control station. For example, the display state selection may be received from the CLDSS circuitry 240 and/or the next action logic 250. In some cases, the lockscreen logic 230 may send contextual updates to the CLDSS circuitry 240 and/or next action logic 250 separate from display state selection update requests. Responsive to a pushed display state token, the lockscreen logic may update the display state selection for the UE 100 based on the received selection and/or data in the display state token (311).

The lockscreen logic 230 may receive a response to the selected display state from the user via user interface 118 (316).

The lockscreen logic may cause additional information to be displayed (318). For example, responsive to user input the lockscreen logic may cause links to more extensive explanations to be displayed. In an example scenario, the display state may include a display of usage for the account. The lockscreen logic may cause display of a link to detailed usage in response to user interaction with the initial usage display.

The lockscreen logic 230 may provide a prompt to the user to facilitate completion of transactions initiated as a result of the display state (319). In the case of display states that include an opportunity for a user to change or initiate services and/or perform acquisitions, the lockscreen logic may present the user with a prompt to complete the transaction. In an example scenario, the lockscreen logic may provide a pre-populated form for a service upgrade. In another example scenario, the lockscreen logic may generate a response message, such as a text message, to facilitate acceptance. For example, a response text message may include a message with specific text that may be sent to a particular service number. In various implementations, the user may be required to further input a code or other secure information for security reasons.

The lockscreen logic 230 may send feedback to the CLDSS circuitry 240 indicating the whether the user accepted, rejected, or ignored of the display state (320).

Figure 4:
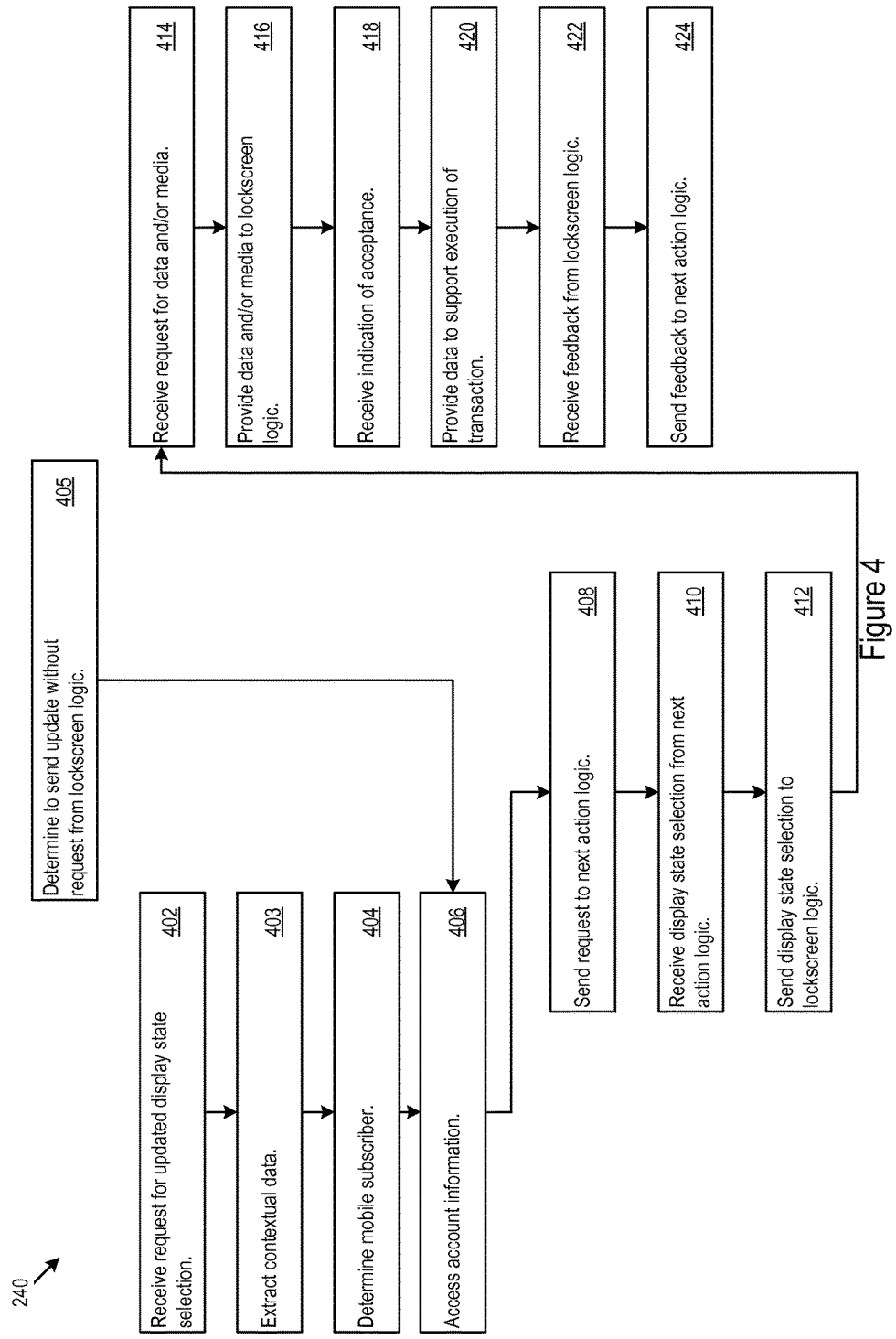
FIG. 4 shows an example of a logical layout for closed-loop display state selection circuitry.

FIG. 4 shows an example of CLDSS circuitry 240. The CLDSS circuitry 240 may receive a request for a display state selection update from lockscreen logic 230 (402). The offer managing logic 240 may extract contextual data from the received request (403). For example, the CLDSS circuitry 240 may extract a location indicator for the lockscreen logic 230.

In various implementations, the CLDSS circuitry 240 may determine to send updated display state selections (405) without receiving a request from the lockscreen logic 230. For example, the CLDSS circuitry 240 may determine that a particular display state has expired or is no longer part of current campaign. If the CLDSS circuitry 240 determines to update a display state selection, the CLDSS circuitry 240 access account information for the mobile subscribers associated with the affected lockscreen logic 230 (406).

The CLDSS circuitry 240 may determine a mobile subscriber associated with the UE 100 on which the lockscreen logic is being executed (404). The CLDSS circuitry 240 may access account information for the mobile subscriber in the account database 260 (406). For example, the CLDSS circuitry 240 may access current account usage and/or billing information for the account. In another example, promotional information such as the availability of free services or upgrades may be accessed by the CLDSS circuitry 240. The CLDSS circuitry 240 may send a request for a display state containing the contextual information and the account information to the next action logic 250 (408).

Responsive to the request, the CLDSS circuitry 240 may receive a display state selection from the next action logic 250 (410). The CLDSS circuitry 240 may send the display state selection to the lockscreen logic 230 (412). The CLDSS circuitry 240 may receive a request for data and/or media to support presentation of the selected display state from the lockscreen logic 230 (414). The CLDSS circuitry may provide the requested data and/or media (416). For example, the CLDSS circuitry may generate a display state token including an updated display state selection and data and media to support the update display state selection.

In various implementations, the CLDSS circuitry 240 may receive an indication from the lockscreen logic that the user has interacted with an opportunity presented by a lockscreen display state of the UE 100 (418). The CLDSS circuitry 240 may provide data to support execution of a transaction responsive to the acceptance. (420). For example, the CLDSS circuitry 240 may provide account information to support pre-population of a sign-up form.

Additionally or alternatively, the CLDSS circuitry 240 may receive feedback from the lockscreen logic 230 indicating whether the opportunities presented by the selected display state were ignored, accepted or rejected by the user (422). The CLDSS circuitry may send the feedback to the next action logic 250 to inform future display state selections (424).

Figure 5:
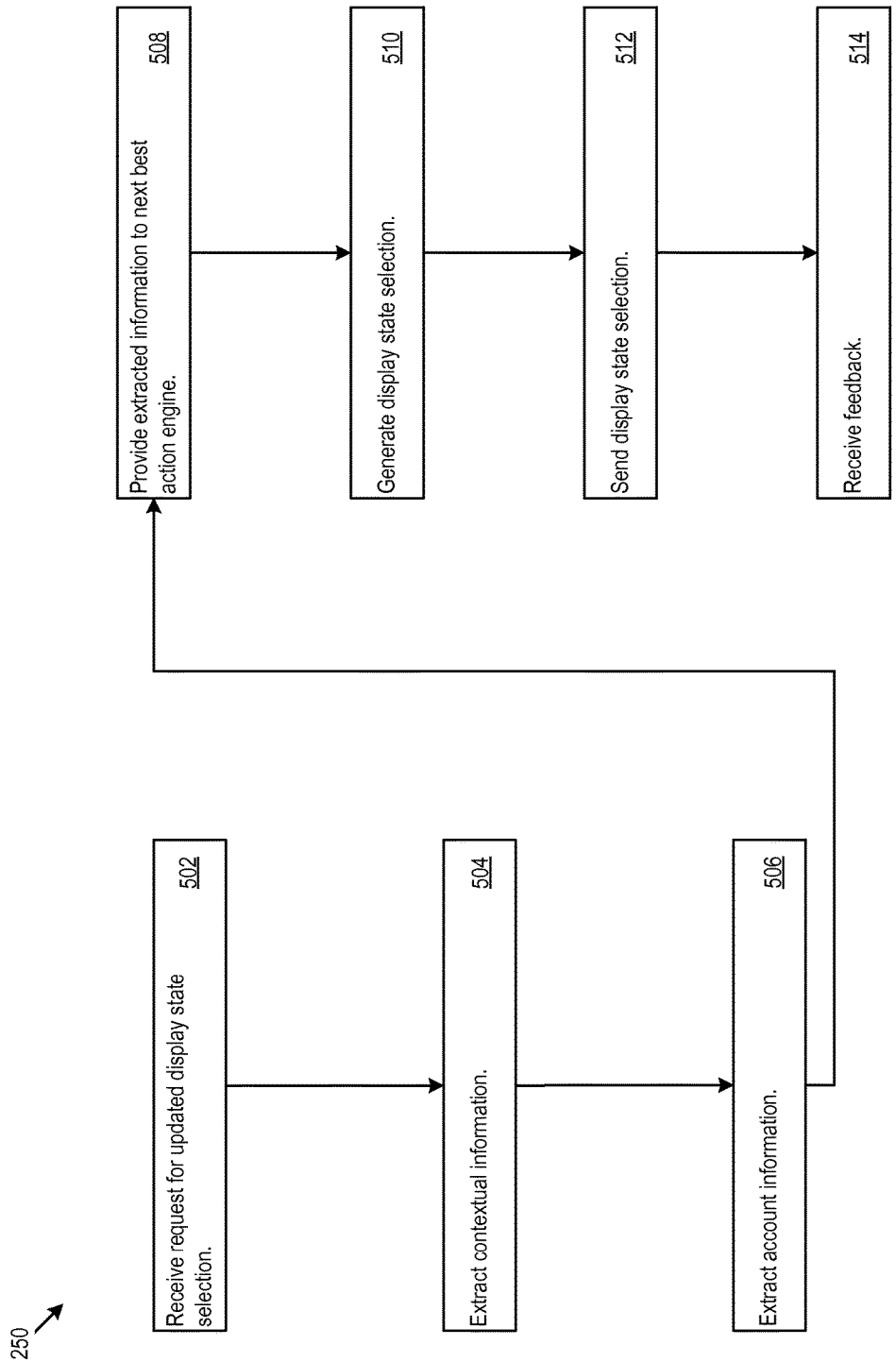
FIG. 5 shows an example of next action logic, which may be implemented on circuitry.

FIG. 5 shows an example of next action logic 250. The next action logic 250 may receive a request from the CLDSS circuitry 240 for a display state selection (502). The next action logic 250 may extract contextual information from the request (504). The next action logic 250 may extract account information from the request (506).

The next action logic 250 may provide the extracted information to a next best action engine 255 (508). The next best action engine 255 may generate a display state selection based on the information provided (510). For example, the next best action engine may select among a finite group of available display states for a display state most relevant based on the provided account and contextual information. For example, an account upgrade display state may not necessarily be provided to a UE that is associated with a user who is not a decision maker for an account. For example, in a shared plan, opportunities to apply account upgrades may be deemed more relevant to UEs associated with account owners rather than basic users. Additionally or alternatively, the display state selection may be based on previous feedback, a predetermined likelihood that a particular offer is selected, parameters for an advertising campaign, and/or other rules consistent with a specific user interaction objective.

In an example scenario, the next best action engine 255 may extrapolate future usage based on past usage. The next best action engine may calculate the charges the mobile subscriber may accrue under the subscriber's current plan and under various available promotions. The next best action engine may select the offer based on the promotion that will lead to the lowest cost for the mobile subscriber. Alternatively, the next best action engine may select an offer showing a comparison of costs for various available promotions. The mobile subscriber may be able to compare costs for competing promotions over different period of time. Other scenarios are presented in the example use cases discussed below.

Once a display state selection has been generated, the next action logic 250 may send the display state selection to the CLDSS circuitry 240 (512). Once a mobile subscriber has had an opportunity to view the selected display state, the next action logic 250 may receive feedback related to the display state selection from the CLDSS circuitry 240 (514).

Figure 6:
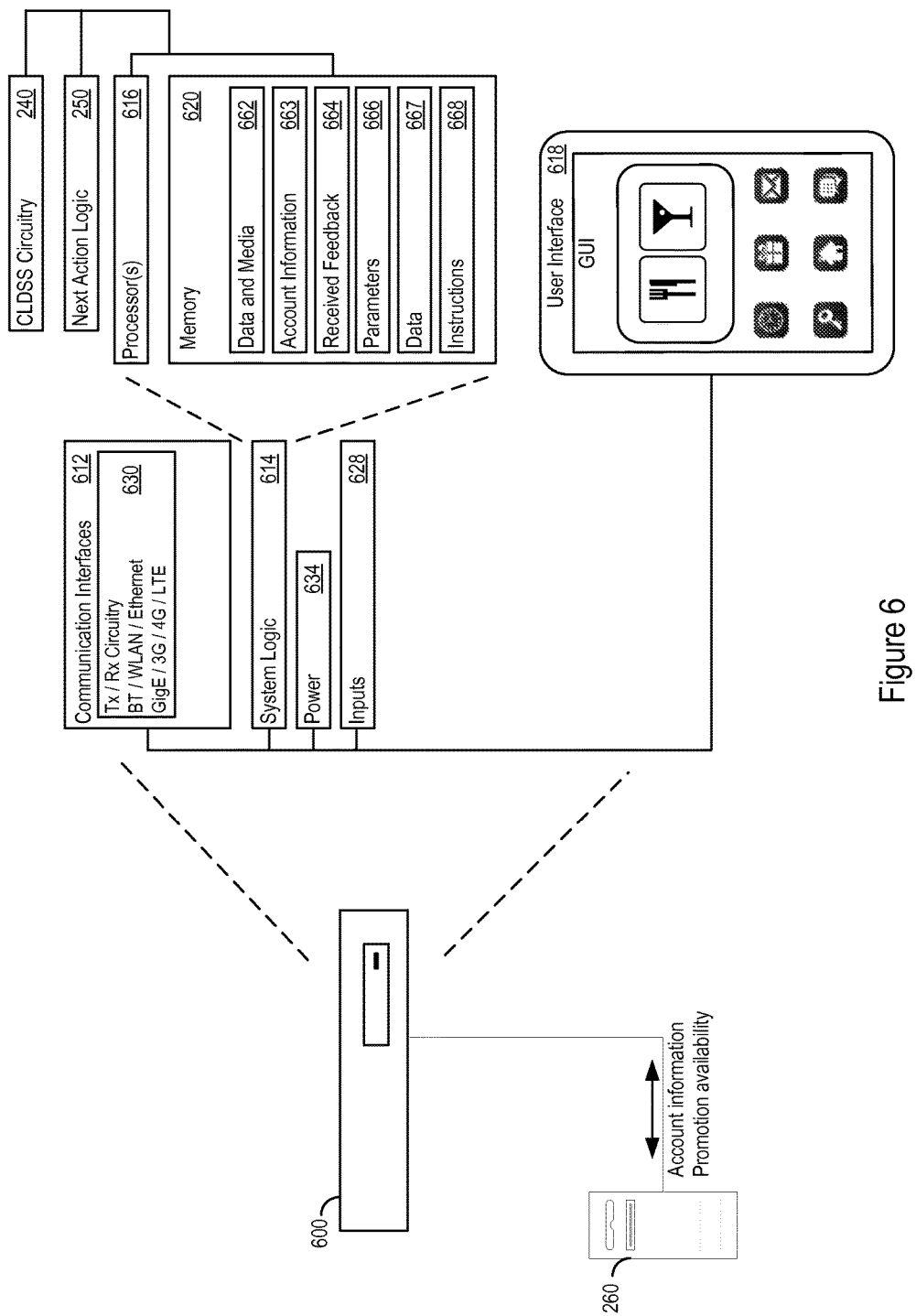
FIG. 6 shows an example of an execution environment.

FIG. 6 shows an example of an execution environment 600 for the logic (e.g. 240, 250) described above. The execution environment 600 may include system logic 614 to support execution and presentation of the visualizations described above. The system logic may include processors 616, memory 620, and/or other circuitry. In various implementations, a next best action engine 255 may be implemented on the processors 616 and/or the memory.

The processors 616 and memory 620 may execution of CLDSS circuitry 240 and/or next action logic 250 for determining display state selections. The processors 616 and memory 620 may further generate display state tokens responsive to the display state selections.

The memory 620, may be used to store the data and/or media for available display state selections 662; account information being processed 663; received feedback 664 from lockscreen logic 230; and/or parameters 666, data 667, and instructions 668 to support the CLDSS circuitry 240 and/or the next action logic 250 described above.

In various implementations, the example execution environment 600 may connect to one or more account databases 260 for access to account information, such as mobile subscriber usage and promotion availability.

The execution environment 600 may also include communication interfaces 612, which may support wireless, e.g. Bluetooth, Wi-Fi, WLAN, cellular (4G, LTE/A), and/or wired, ethernet, Gigabit ethernet, optical networking protocols. The communication interface may support communication with external or third-party servers and/or account databases 260. The execution environment 600 may include power functions 634 and various input interfaces 628. The execution environment may also include a user interface 618 that may include human interface devices and/or graphical user interfaces (GUI). The GUI may be used to present a management dashboard, actionable insights and/or other information to the user. In various implementations, the system logic 614 may be distributed over multiple physical servers and/or be implemented as one or more virtual machines.

In various implementations, one or more components of the account-targeted lockscreen display state architecture, for example a portion of the lockscreen logic 230, may be implemented as a mobile application. In some cases, the mobile application may be pre-loaded on a subscriber UE at the time of provision to the subscriber. In some cases, the mobile application may be downloaded to the subscriber UE as a portion of the initialization service for the UE. In some cases, mobile subscriber may download the mobile application from an application service, such as Google Play, the Apple App Store, an application download service maintained by the wireless carrier for the mobile subscriber, and/or other mobile application download services. In some cases, a display state token may include a mobile application or an identifier for a mobile application for download to support execution of a selected display state. The wireless carrier of the mobile subscriber may provide incentives to encourage download and installation of the mobile application.

Additionally or alternatively, the next action logic 250 may be distributed over the execution environment 600 and/or the UE 100. For example, a portion the next action logic 250 present on the execution environment 600 may determine to update the display state selection on the UE 100 based on contextual and account information provided by the CLDSS circuitry 240. The portion of the next action logic 250 present on the UE 100 may determine the display state selection based on the input from CLDSS circuitry 240. The input may include account status, business rules, next best action information, and/or other inputs. The next action logic 250 present on the UE 100 may provide a display state selection update directly to the lockscreen logic 230 instead of first transferring the selection to the CLDSS circuitry 240.

Figure 7:
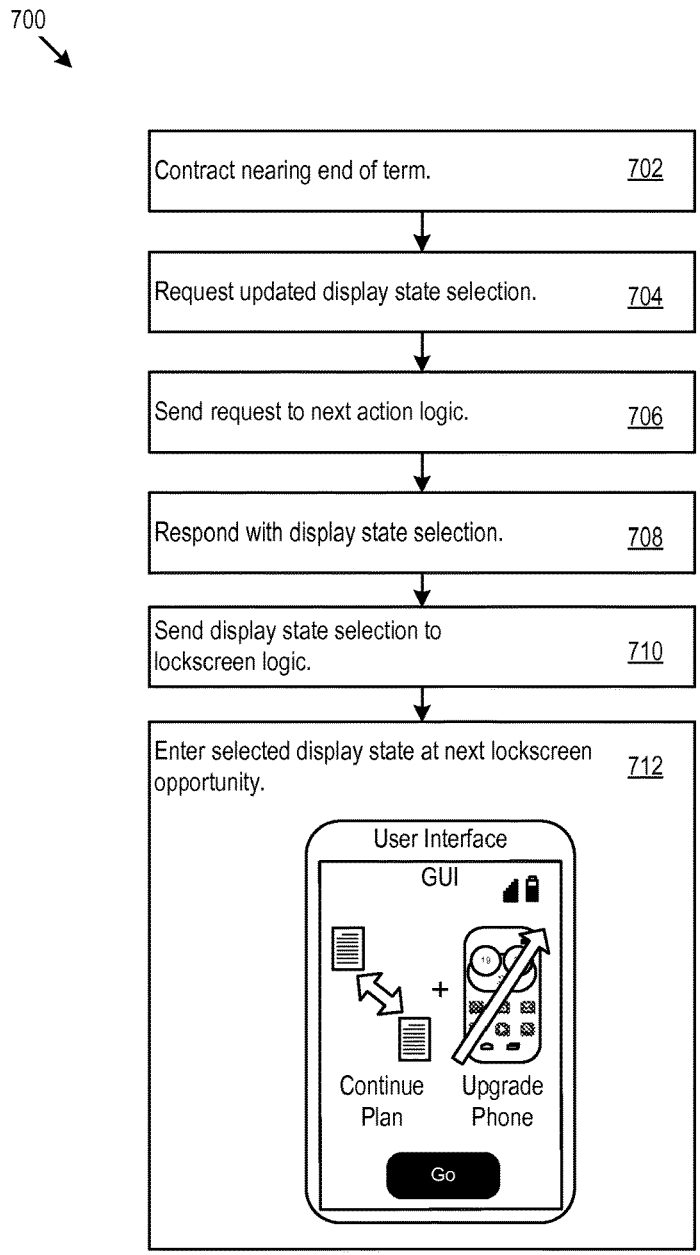
FIG. 7 shows an example of a usage scenario for the closed-loop lockscreen display state control architecture.

FIG. 7 shows an example of a usage scenario 700 for the account-targeted lockscreen display state architecture discussed above. A mobile subscriber's contract may be nearing the end of the contract term (702). The lockscreen logic 230 may request an updated display state selection for the next lockscreen opportunity (704). The CLDSS circuitry 240 may send a request to the next action logic 250 indicating the nearing term expiry (706). The next action logic 250 may respond with a display state selection for a display state allowing extension of the current contract and a free phone upgrade (708). The display state may be sent to the lockscreen logic (710). The lockscreen logic may enter the display state at the next lockscreen opportunity (712).

Figure 8:
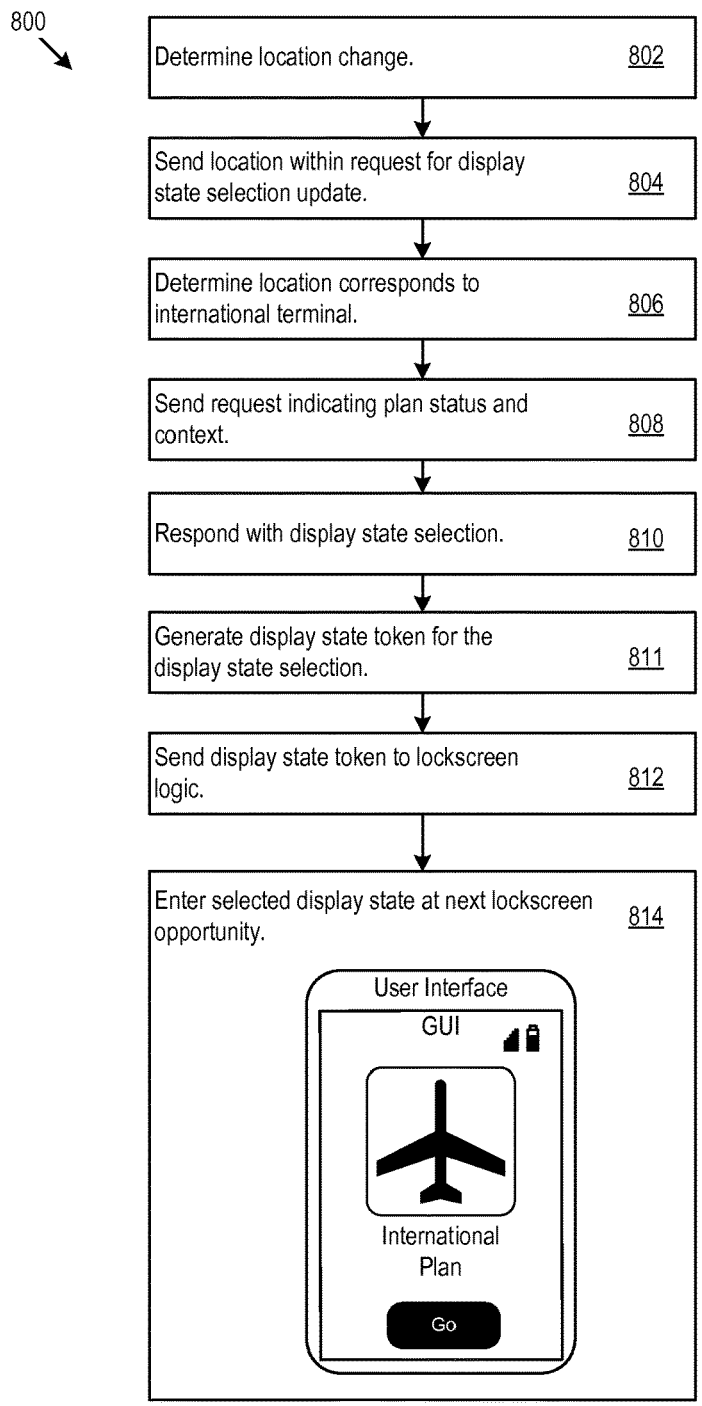
FIG. 8 shows another example of a usage scenario for the closed-loop lockscreen display state control architecture.

FIG. 8 shows another example of a usage scenario 800 for the account-targeted lockscreen display state architecture discussed above. The lockscreen logic may determine that the location of the mobile device has changed (802). The lockscreen logic 230 may send the location in a request for a display state selection update to the CLDSS circuitry logic 240 (804). The CLDSS circuitry 240 may determine that the location corresponds to an international terminal in an airport (806). The CLDSS circuitry 240 may also access account information indicating that the mobile subscriber lacks an international service plan. The CLDSS circuitry 240 may send a request to the next action logic 250 indicating the airport context and plan status (808). The next action logic 250 may respond with a display state selection for an international plan (810). The CLDSS circuitry 240 may generate a display state token for the display state selection (811). The display state token may be sent to the lockscreen logic 230 (812). The lockscreen logic 230 may enter the selected display state at the next lockscreen opportunity (814).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium, which may be considered non-transitory. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
   wireless interface circuitry configured to:
   establish a communication link between a mobile device and a control station maintained by a wireless carrier;
   transmit a display state token to the mobile device to implement closed-loop control of a lockscreen display state for display on a display of the mobile device when the mobile device is in a lockscreen state associated with device inactivity; and
   control circuitry at the control station, the circuitry coupled to the wireless interface circuitry, the control circuitry configured to:
   identify an identity of a user of a device registered with a mobile subscription service;
   determine an account status of the user;
   determine multiple display states for the device relating to the mobile subscription service based on the account status, each of the multiple display states including different content for display on the display of the mobile device during the lockscreen state;
   determine a display state selection to present to the user from among the multiple display states based on content for display of the display state selection during the lockscreen state; and
   generate a display state token responsive to the display state selection, the display state token comprising an indicator of the display state selection.

2. The system of claim 1, where the display of the mobile device comprises multiple pixels.

3. The system of claim 2, where the display state token comprises information for determining a physical state of a pixel of the multiple pixels while the mobile device is in the display state.

4. The system of claim 1, where:
the control circuitry comprises closed-loop display state selection (CLDSS) circuitry; and
the CLDSS circuitry is configured to implement closed-loop control of the display state via the display state token.

5. The system of claim 1, where:
the display is configured to display a security logon while the mobile device is in the display state.

6. The system of claim 5, where the display is further configured to display an account upgrade opportunity alongside the security logon while the mobile device is in the display state.

7. The system of claim 6, where the account upgrade opportunity is targeted to the device.

8. The system of claim 6, where the account upgrade opportunity is targeted to a user of the device.

9. The system of claim 1, where the control circuitry is configured to push a mobile application to the mobile device for execution while the mobile device is in the display state.

10. The system of claim 1, where the wireless interface circuitry is further configured to receive for location data for the mobile device for use in determining the display state selection.

11. The system of claim 1, where the account status comprises cellular usage data for an account to which the mobile device is registered.

12. A method, comprising:
identifying, with circuitry, an identity of a user of a device registered with a mobile subscription service;
determining an account status of the user;
determining, with the circuitry, multiple display states for the device relating to the mobile subscription service based on the account status, each of the multiple display states including different content for display on the display of the mobile device during a lockscreen state associated with device inactivity;
determining a display state selection to present to the user from among the multiple display states based on content for display of the display state selection during the lockscreen state;
generating a display state token responsive to the display state selection, the display state token comprising an indicator of the display state selection; and
transmitting the display state token to the device to implement closed-loop control of a lockscreen display state for display on a display of the device when the device is in the lockscreen state.

13. The method of claim 12, where:
the circuitry comprises closed-loop display state selection circuitry; and
generating the display state token comprises selecting instructions for determining a physical state for a pixel on the display of the device.

14. The method claim 12, where determining the account status of the user comprises determining cellular usage for multiple devices registered to an account of the user.

15. The method of claim 12, further comprising:
receiving, via a communication interface, contextual information associated with the device; and
determining, with the circuitry, multiple display states for the device relating to the mobile subscription service based on the contextual information.

16. The method of claim 15, where:
receiving the contextual information comprises receiving an indication of a location of the device; and
determining the display state selection comprises selecting the lockscreen display state responsive to the location of the device.

17. A product comprising:
a computer readable medium other than a transitory signal; and
instructions stored on the computer readable medium, the instructions configured to, when executed:
establish, via a wireless interface, a communication link between a device and closed-loop display state selection (CLDSS) circuitry maintained by a wireless carrier;
determine to cause a user interface on the device to enter a display state at a lockscreen invocation associated with device inactivity;
evaluate an update criterion for the display state selection, the display state selection configured to indicate the display state for the lockscreen invocation;
responsive to evaluating the update criterion, transmit, via the communication link a request for a display state selection update to the CLDSS circuitry;
cause, in response to the request, the CLDSS circuitry to:
determine multiple display states for the device based on subscriber identity register data accessed from an account database associated with the wireless carrier, each of the multiple display states including different content for display during the lockscreen invocation;
determine the display state selection update from among the multiple display states based on content for display during the lockscreen invocation for the display state selection update; and
generate a display state token;
receive, via the communication link, the display state token from the CLDSS circuitry;
responsive to the display state token, update the display state selection on the device; and
after updating the display state selection, cause the user interface to enter the display state during the lockscreen invocation.

18. The product of claim 17, where the instructions are further configured to cause a display of the device to display a security logon while the device is in the display state.

19. The product of claim 18, where the instructions are further configured to cause the display to display an account upgrade opportunity alongside the security logon while the device is in the display state.

20. The product of claim 17, where the instructions are further configured to, responsive to the display state token, download a mobile application for execution while the device is in the display state.

* * * * *